United States Patent
Amine et al.

[11] Patent Number: 6,024,934
[45] Date of Patent: Feb. 15, 2000

[54] METHOD FOR PRODUCING POSITIVE ACTIVE MATERIAL OF LITHIUM SECONDARY BATTERY

[75] Inventors: Khalil Amine; Hideo Yasuda; Yuko Fujita, all of Kyoto, Japan

[73] Assignee: Japan Storage Battery Co., Ltd., Kyoto, Japan

[21] Appl. No.: 08/936,604

[22] Filed: Sep. 24, 1997

[30] Foreign Application Priority Data

Sep. 24, 1996 [JP] Japan ................................. 8-274185

[51] Int. Cl.⁷ .......................... C01B 13/14; C01F 13/14; C01G 49/00; H01M 4/48
[52] U.S. Cl. .......................... 423/592; 423/592; 423/593; 423/594; 423/596; 423/599; 423/641; 429/194; 429/195; 429/223; 429/224; 429/231.1; 429/231.2; 429/231.3
[58] Field of Search ...................... 423/592, 593, 423/594, 596, 599, 641; 429/195, 223, 224, 194, 231.1, 231.2, 231.3

[56] References Cited

U.S. PATENT DOCUMENTS

| | | | |
|---|---|---|---|
| 4,668,595 | 5/1987 | Yoshino et al. | 429/194 |
| 4,770,960 | 9/1988 | Nagaura et al. | 429/194 |
| 5,264,201 | 11/1993 | Dahn et al. | 423/594 |
| 5,393,622 | 2/1995 | Nittta et al. | 429/223 |
| 5,474,752 | 12/1995 | Yamamoto | 423/596 |
| 5,478,675 | 12/1995 | Nagaura | 429/224 |
| 5,605,773 | 2/1997 | Ellgen | 429/194 |
| 5,631,105 | 5/1997 | Hasegawa et al. | 429/194 |

FOREIGN PATENT DOCUMENTS

| | | |
|---|---|---|
| 0554906 | 8/1993 | European Pat. Off. . |
| 0728702 | 8/1996 | European Pat. Off. . |
| 0730314 | 9/1996 | European Pat. Off. . |
| 5-283076 | 10/1993 | Japan . |

OTHER PUBLICATIONS

Tabuchi M et al. "Electrochemical and magnetic properties of lithium manganese oxide spinels prepared by oxidation . . . obtained LiMnO2", Solid State Ionics, vol. 89, No. 1–2, Aug. 1, 1996, pp. 53–63.

*Primary Examiner*—Gary P. Straub
*Assistant Examiner*—Cam N. Nguyen
*Attorney, Agent, or Firm*—Sughrue, Mion, Zinn Macpeak & Seas, PLLC

[57] ABSTRACT

Lithium compound and nickel oxyhydroxide containing a transition metal (Me) such as V, Cr, Mn, Fe, Zn and Co are suspended in water or in an organic solvent, and the solution is reacted with each other in an autoclave by a hydrothermal method to thereby synthesize transition metal-containing lithium nickelate.

7 Claims, 2 Drawing Sheets

(a) (a=2.877Å, c=14.299Å, V=102.54Å³)

(b) (a=2.871Å, c=14.190Å, V=101.30Å³)

$2\theta / °K(\alpha)$

METHOD FOR PRODUCING POSITIVE ACTIVE MATERIAL OF LITHIUM SECONDARY BATTERY

BACKGROUND OF THE INVENTION

1. Field of the Invention

The present invention relates to a method for producing a positive active material of a lithium secondary battery using an organic electrolytic solution, a polymer electrolyte or an inorganic solid electrolyte.

2. Description of the Related Art

At present, a so-called lithium ion secondary battery using a carbon material as a negative electrode, lithium cobaltate ($LiCoO_2$) which is a lithium intercalation compound having a layered structure as a positive electrode and an organic electrolytic solution as an electrolyte has been put into practice. This battery is used in various kinds of portable electronic appliances because it has very high energy density. Lithium cobaltate as a positive active material has several advantages such as high operating voltage 4V vs. $Li/Li^+$; high practical specific capacity of about 150 mAh/g; and good cyclic reversibility. However, cobalt is expensive because of the limited reserve in view of natural resources. Therefore, lithium nickelate ($LiNiO_2$) could be an alternative replacement to lithium cobaltate.

Similar to lithium cobaltate, lithium nickelate has a hexagonal layered structure belonging to a space group R3m. In lithium nickelate, the potential is about 4V vs. $Li/Li^+$ and the practical specific capacity is about 200 mAh/g which is higher than that of lithium cobaltate. When this material is used as a positive electrode, however, multi-stage processes take place with the cell potential showing 4 plateaus indicating a four-phase reaction due to the occurrences of several structural transitions during charging and discharging. As a result, the electrochemical performance of the battery degraded very quickly upon cycling, for example, as reported in Solid State Ionics, 44, 87 (1990). Accordingly, although the specific capacity was of a very large value about 200 mAh/g initially, it decreases greatly upon repeated charging/discharging. In charge and discharging curves, the structural transition takes place with the presence of 4 plateaus in the potential curve.

In order to suppress the structural transition upon charging and discharging, it is effective to replace a part of nickel with another element. For example, replacement of nickel with cobalt has been reported in Chem. Express, 6, 161 (1991). In this case, a high-temperature solid phase sintering method was used in which: aqueous solutions of $Ni(NO_3)$, $Co(NO_3)_2$ and LiOH are mixed; and the resulting mixture is dried at 90° C. in advance, and then sintered at 800° C. in air. Further, replacement of a part of nickel with manganese has been reported in Solid State Ionics, 57, 311 (1992) and replacement of a part of nickel with an alkali-earth metal (at the rate in a range of 0.05 to 0.10) such as magnesium, calcium, strontium, barium, etc. has been reported in the 36th Battery Discussion Meeting Lecture Summary, 9, 17, (195). In any case, the fading of capacity with the charging/discharging cycle has been limited compared with the case of pure $LiNiO_2$. There is, however, a problem that the initial specific capacity is relatively low.

Generally, when a high-temperature solid phase sintering method is employed at about 750° C., the specific capacity density becomes low because vaporization of lithium occurs so that stoichiometrical active material cannot be obtained easily. In the solid sintering method, the sintering temperature should be lowered so as to avoid the vaporization of lithium at a high temperature. In this case, however, lithium nickelate cannot be obtained successfully. For improvement of this point, there is an effective countermeasure in which not respective salts of nickel and cobalt but a complex oxyhydroxide of nickel and cobalt is used as a starting material, for example, as described in the 36th Battery Discussion Meeting Lecture Summary, P.65 (1995). That is, although both nickel salt and cobalt salt are ordinarily divalent, both Ni and Co must be oxidized to trivalent state in order to synthesize cobalt-containing lithium nickelate represented by the composition $LiNi_{1-x}Co_xO_2$. The oxidation of each of Ni and Co from divalent to trivalent state cannot be achieved at a low temperature. On the contrary, if Ni and Co are provided in the form of oxyhydroxide ($Ni_{1-x}Co_xOOH$), $LiNi_{1-x}Co_xO_2$ is generated even at a low temperature of 400 to 500° C. when oxyhydroxide ($Ni_{1-x}Co_xOOH$) is made to react with a lithium compound because both Ni and Co are trivalent.

In the low-temperature solid phase sintering method, very high specific capacity of 190 mAh/g can be obtained when nitrate is used as the lithium compound whereas a specific capacity not higher than about 160 mAh/g can be obtained when hydroxide is used. This is because lithium nitrate is melted at a temperature of about 253° C. and then reacts with oxyhydroxide easily whereas no melting takes place when lithium hydroxide is used. As described above, lithium nitrate is an excellent starting material in terms of improvement of the specific capacity but has a disadvantage in that harmful $NO_x$ gas is generated in the solid sintering process. Further, high specific capacity is obtained when a mixture gas of argon (80%) and oxygen (20%) is used as an atmospheric gas in the sintering process. However, when air, used as the sintering atmosphere there arises a problem that the specific capacity is reduced because lithium carbonate is generated as impurities due to the presence of carbon dioxide.

On the other hand, as a method of synthesizing a lithium secondary battery active material, there is used a so-called hydrothermal method in which a reaction can be made to progress, for example, at a low temperature not higher than 250° C. and at a high pressure. The hydrothermal method is, however, heretofore applied only to synthesis of $LiFeO_2$ (Solid State Ionics, 79, 1369 (1995)) and synthesis of $LiMnO_2$ (Proc. First Scientific Workshop for Electrochem. Materials, p.75 (1996)), for example, by using an iron compound and lithium hydroxide as starting materials.

As described above, the method of synthesizing lithium nickelate $LiNi_{1-x}Me_xO_2$ partially replaced by other elements cannot simultaneously satisfy: (A) high specific capacity; (B) prevention of generation of $NO_x$ gas at the time of synthesizing; and (C) use of air as an atmosphere at the time of synthesizing.

SUMMARY OF THE INVENTION

It is an object of the present invention to provide a method for producing a lithium nickelate positive active material in which the specific capacity is large and no phase transition takes place during the cycling process.

In the method according to the present invention, a complex oxyhydroxide ($Ni_{1-x}Me_xOOH$) of nickel and any transition metal other than nickel and a lithium compound are made to react with each other in an autoclave at a low temperature of from 105° C. to 250° C. under high pressure by a hydrothermal method to thereby synthesize $LiNi_{1-x}Me_xO_2$.

The present invention provides a method for producing a transition metal-containing lithium nickelate, having no phase transition upon cycling at a low temperature in air and exhibiting high specific capacity. This synthesizing method not only has an advantage that air is used without generation of $NO_x$, but also has a very great industrial value in that the large electric power consumed by an electric furnace as in the conventional high-temperature sintering can be saved because this method is a low-temperature synthesizing method.

DETAILED DESCRIPTION OF THE INVENTION

Figure 1:
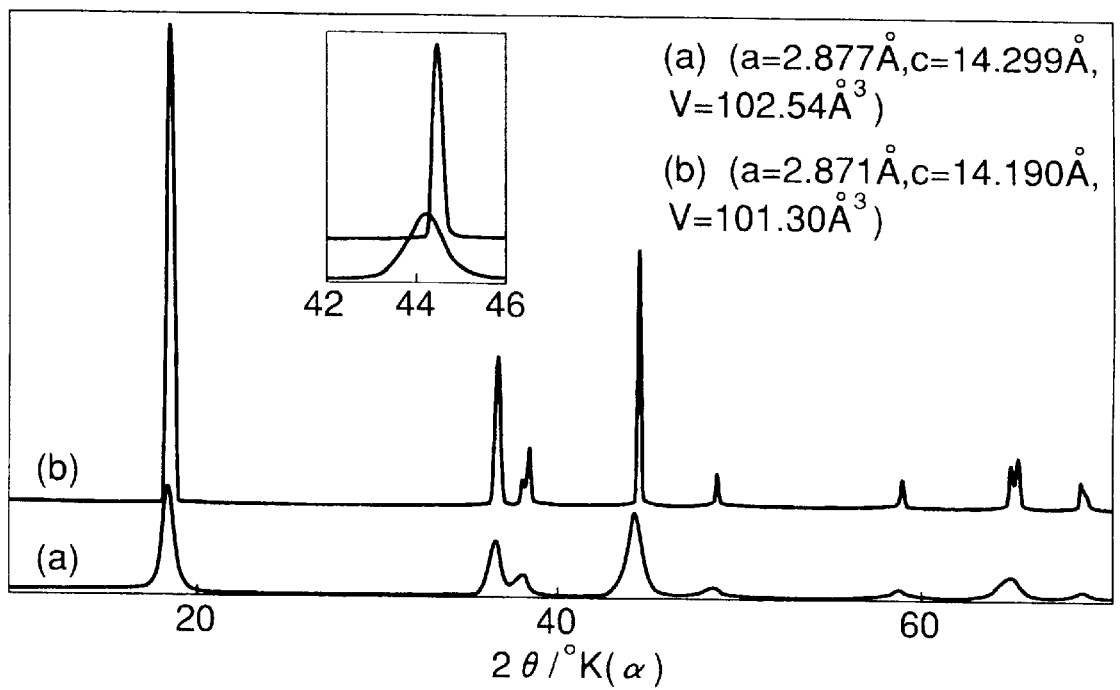
FIG. 1 shows X-ray analysis graphs in which a line (a) exhibits the X-ray analysis of a positive active material according to the present invention and (b) exhibits a positive active material according to a conventional method.

The present invention will be described in detail as follows.

When an aqueous solution of a complex oxyhydroxide and a lithium compound or a suspension of the complex oxyhydroxide and a lithium compound in an organic solvent solution is put in an autoclave and heated at a temperature in a range of 105° C. to 250° C. while the content of the autoclave is pressurized in a range of 10 to 500 atm, lithium nickelate ($LiNi_{1-x}Me_xO_2$) containing any metal other than nickel is generated relatively easily by hydrothermal reaction. In this case, the atmosphere in the autoclave does not always need an oxygen atmosphere. Further, not only can the reaction progress even in the case where a hydroxide is used as the lithium compound but can also progress where the reaction temperature is too low to generate $NO_x$ even in the case where a nitrate is used as the lithium compound. Although the mechanism of the hydrothermal reaction has not been made sufficiently clear yet, it can be thought of that the reaction is a kind of ion exchange reaction such as $Ni_{1-x}Me_xOOH + Li^+ \rightarrow LiNi_{1-x}Me_xO_2 + H^+$.

Alkali hydroxide is added to a mixture aqueous solution of nickel salt and salt of any transition metal other than nickel, such as vanadium, chromium, manganese, iron or cobalt to thereby generate a co-precipitated complex hydroxide of nickel and the transition metal other than nickel. Then, for example, alkali peroxodisulfate (alkaline solution) is made to act on the co-precipitated complex hydroxide to oxidize the co-precipitated complex hydroxide so as to obtain the complex oxyhydroxide. The transition metal content x is suitably selected to be in a range of from 0.05 to 0.5.

Inorganic salt, hydroxide or salt of any organic acid such as acetic acid, oxalic acid, citric acid, tartaric acid, propionic acid, etc. may be used as the lithium salt. Further, although water is most suitable as the solvent for the lithium salt, an organic solvent such as methanol, ethanol, acetone, acetonitrile, etc. or a mixture solvent of the organic solvent and water may be used effectively.

The thus obtained $LiNi_{1-x}Me_xO_2$ is formed in an electrode together with carbon powder or metal powder as a conduction assisting agent and a binder by a known method. When this electrode is used as a positive electrode for a lithium secondary battery, the charging/discharging curve shows a monotonous variation of the potential indicating one phase reaction taking place. Accordingly, the cycle life is prolonged.

Examples of the present invention will be described below in detail.

EXAMPLE 1

$Ni_{0.85}Co_{0.15}OOH$ of a complex oxyhydroxide of nickel and cobalt and an excess amount of lithium hydroxide exceeding the stoichiometry were suspended in water. The suspension was put in an autoclave. The autoclave was heated at 170° C. for 3 days. In this case, the inner pressure of the autoclave was set in a range of 10 to 200 atm. Then, the reaction product was washed with water and dried at 90° C. An X-ray diffraction pattern of the sample thus obtained is shown as a line (a) in FIG. 1. Incidentally, for comparison, an X-ray diffraction graph of a sample obtained by a conventional high-temperature solid phase reaction method (in air at 750° C.) with use of the same starting materials is shown as a line (b) in FIG. 1.

It is apparent from FIG. 1 that each of the two samples is $LiNi_{0.85}Co_{0.15}O_2$ having a hexagonal layered structure. The lattice parameters of the sample according to the present invention were a=2.877 Å, c=14.299 Å and v=102.54 Å$^3$ whereas the lattice parameters of the sample according to the conventional method were a=2.871 Å, c=14.190 Å and v=101.30 Å$^3$. The c-axis parameter of the sample according to the present invention is larger than that of the conventional sample. Therefore, in the sample according to the present invention, the interlayer distance is large so that lithium ions can be extracted and intercalated back very easily. Moreover, nickel ions are not shifted to the lithium site since the material is prepared at low temperature via ion exchange process so that phase transition hardly occurs.

Then, $LiNi_{0.85}Co_{0.15}O_2$ obtained by the above-mentioned process, 5% of acetylene black as an electrically conductive agent and 5% of an n-methyl-2-pyrolidone solution (3% concentration) of polyvinylidene fluoride as a binding agent were mixed with each other to give a paste shape. The paste was applied on an aluminum net as a current collector and then dried in vacuum at 250° C. to thereby form an electrode having a size of 25×25 (mm). The cell comprising, this lithium cobaltate nickelate ($LiNi_{0.85}Co_{0.15}O_2$) used as a positive electrode, metal lithium used as a counter electrode and an electrolytic solution composed of 1M•$LiClO_4$ salt dissolved in mixed solvents of ethylene carbonate and diethyl carbonate, was tested. Incidentally, metal lithium was used as a reference electrode.

Figure 2:
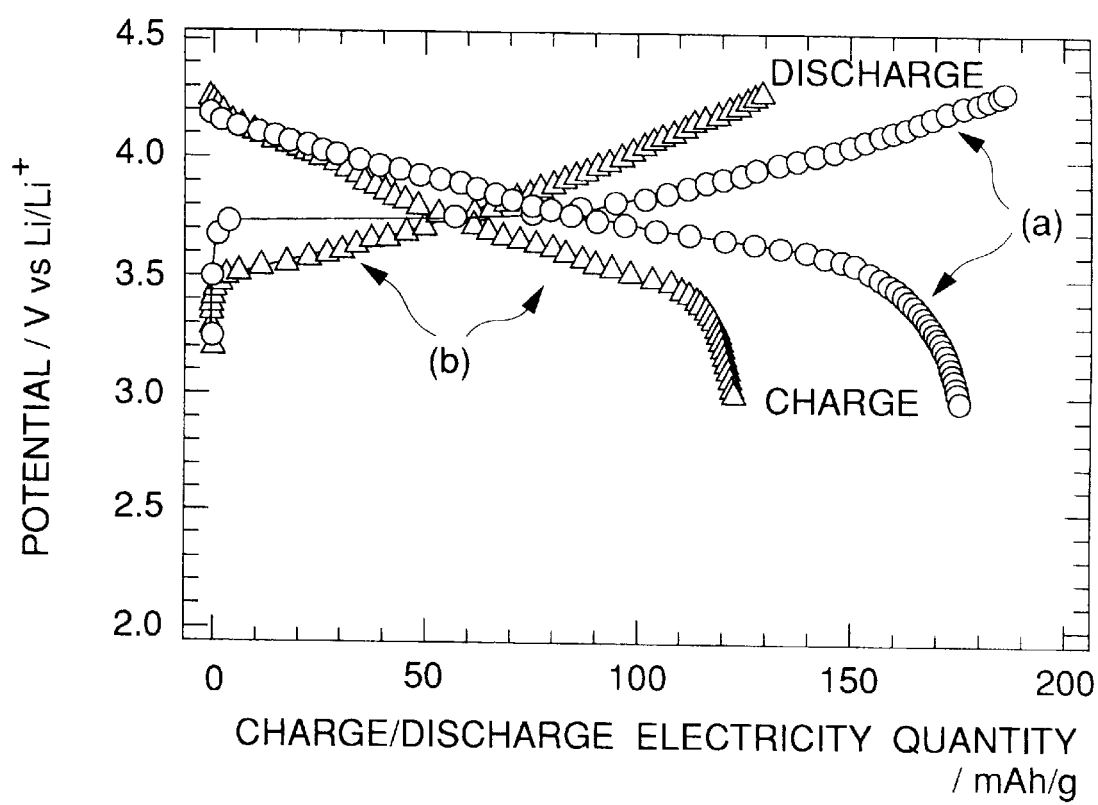
FIG. 2 shows a graph exhibiting charging/discharging characteristic of a positive electrode (a) according to the present invention and a positive electrode (b) according to the conventional method.

FIG. 2 shows a first-cycle charging/discharging curve of the positive electrode (a) according to the present invention and the positive electrode (b) according to the conventional method. In each case, the variation of the potential of the charging/discharging curve is monotonous. It is however apparent that the specific capacity (175 mAh/g) in the positive electrode produced by the method according to the present invention is considerably larger than that (120 mAh/g) in the positive electrode produced by the conventional method. Further, when the two electrodes were tested with the current density of 0.5 mA/cm$^2$, the charging end potential of 4.1 V (by reference to the lithium electrode) and the discharging end potential of 3.0 V, each of the two electrodes exhibited 98% of the initial capacity after 50th cycle.

EXAMPLE 2

The complex oxyhydroxide $Ni_{0.85}Co_{0.15}OOH$ in the Example 1 was replaced by nickel-manganese complex oxyhydroxide $Ni_{0.85}Mn_{0.15}OOH$. After sodium hydroxide was added to a mixture aqueous solution of nickel nitrate and manganese nitrate so that a complex hydroxide was precipitated, a sodium hydroxide solution of peroxodisulfate salt was added thereto thus to prepare the oxyhydroxide. Then, the nickel-manganese complex oxyhydroxide and the lithium acetate equivalent in amount to the former were dispersed in 500 ml of ethanol solution, and the dispersion was subjected to a hydrothermal reaction in an autoclave at 220° C. As a result, $LiNi_{0.85}Mn_{0.15}O_2$ was obtained. The specific capacity of this active material was 172 mAh/g.

What is claimed is:

1. A method for producing a positive active material of a lithium secondary battery comprising the steps of:

dissolving or suspending a lithium compound and a complex oxyhydroxide ($Ni_{1-x}Me_xOOH$) of nickel and a transition metal (Me) other than nickel in an organic solvent or water; and reacting said components in a pressurized autoclave by a hydrothermal method.

2. A method for producing a positive active material of a lithium secondary battery according to claim 1, wherein said transition metal (Me) comprises at least one of V, Cr, Mn, Fe, Zn and Co.

3. A method for producing a positive active material of a lithium secondary battery according to claim 1, wherein said lithium compound comprises inorganic salt, hydroxide or organic salt of lithium.

4. A method for producing a positive active material of a lithium secondary battery according to claim 1, wherein x in the formula $LiNi_{1-x}Me_xO_2$ satisfies $0.05<x<0.5$.

5. A method for producing a positive active material of a lithium secondary battery according to claim 1, wherein said organic solvent is at least one of ethanol, methanol, acetone and acetonitrile.

6. A method for producing a positive active material of a lithium secondary battery according to claim 1, wherein when in said reacting step by hydrothermal method, the temperature is in the range of 105 to 250° C.

7. A method for producing a positive active material of a lithium secondary battery according to claim 1, wherein when in said reacting step by hydrothermal method, the pressure is in the range of 10 to 500 atm.

* * * * *